(12) United States Patent  (10) Patent No.: US 8,171,428 B2
Ding  (45) Date of Patent: May 1, 2012

(54) SYSTEM AND METHOD FOR IMPLEMENTING DATA NAVIGATION INTERFACE

(75) Inventor: Li Ding, North York (CA)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 11/843,174

(22) Filed: Aug. 22, 2007

(65) Prior Publication Data

US 2009/0055769 A1  Feb. 26, 2009

(51) Int. Cl.
 *G06F 3/048* (2006.01)
(52) U.S. Cl. .......................... 715/854; 715/762; 715/763

(58) Field of Classification Search .................... 715/854
See application file for complete search history.

(56) References Cited

U.S. PATENT DOCUMENTS

| 6,470,383 B1 * | 10/2002 | Leshem et al. ................. 709/223 |
| 6,691,282 B1 * | 2/2004 | Rochford et al. .............. 715/234 |
| 2008/0250345 A1 * | 10/2008 | Li et al. ........................ 715/803 |

* cited by examiner

*Primary Examiner* — Dennis-Doon Chow
*Assistant Examiner* — Anil Kumar
(74) *Attorney, Agent, or Firm* — Cantor Colburn LLP; Libby Toub

(57) ABSTRACT

An interactive user interface (UI) to manage searching of data is disclosed. The UI includes a first display panel configured to display a parent context view and a child context view thereon and a second display panel configured to display a diagram of an enlarged portion of the child context view.

6 Claims, 2 Drawing Sheets

SYSTEM AND METHOD FOR IMPLEMENTING DATA NAVIGATION INTERFACE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to interactive user interfaces (UI) within computing environments, and more particularly, to a system and method for implementing data set navigation.

2. Description of Background

Existing software tools have utilized diagrams to visualize data organized within large data sets, such as application structure diagrams, source code call graphs, procedure diagrams, and large network monitoring diagrams, for example. A diagram of a large data set may include thousands of nodes and connection lines between each data node. Therefore, user interface (UI) scalability, or the ability to present the large data set in a manner such that a user can effectively navigate through the diagram and find desired information represents a challenge for present software tools.

Present software tools provide an overview that displays a zoomed-out, higher-level view implemented as a thumbnail figure. Typical overview displays support only one level of mapping of a parent-child hierarchy view expansion, and do not represent the relationship among data siblings within a particular hierarchical level. A relative context between the present view and its parent as provided by the overview is changed when a user that is working with multiple views switches from one view to another. This may cause the user may become disoriented and lose track of how the data presented in a current view fits into a global context. Accordingly, there is a need for an enhanced data visualization and navigation arrangement.

SUMMARY OF THE INVENTION

The shortcomings of the prior art are overcome and additional advantages are provided through the provision of a UI that manages a global context of large data sets. The UI allows a user to ascertain global context changes and relationships among different views during navigation of large data sets with multiple views.

One embodiment of the invention provides an interactive UI to manage searching of data. The UI includes: a first display panel configured to display a parent context view and a child context view thereon and a second display panel configured to display one or more diagrams of an enlarged portion of the child context view. The UI further includes at least one data node and a first indicator organized within the parent context view, a second indicator to indicate a relationship between the child context view and the parent context view, and a third indicator organized within the child context view. The first indicator is responsive to selection of one of the data nodes to indicate a relationship between the selected data node and the child context view and the third indicator indicates the enlarged portion of the child context that is related to the selected data node and displayed on the second display panel. The second display panel is responsive to selection of one of the diagrams to select the corresponding data node and thereby display the diagram of the portion of the child context view related to the selected data node.

Another embodiment of the invention provides a method for navigating data. The method includes displaying an interactive UI that includes a first display panel having a parent context view and a child context view, and a second display panel having an enlarged portion of the child context view. The method further includes selecting a data node from one or more data nodes organized within the parent context view. Following such selection, displaying a first indicator within the parent context view to indicate a relationship between the selected data node and the child context view, displaying a second indicator to indicate a relationship between the child context view and the parent context view, and displaying a third indicator within the child context view that is related to the selected data node to indicate the enlarged portion of the child context view displayed within the second display panel. The method further includes choosing a diagram displayed upon the second display panel, the diagram corresponding to one of the one or more data nodes organized within the parent context view and, in response to the choosing, selecting the one data node that corresponds to the chosen diagram.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that allows a user viewing multiple views of a large data set to keep track of the global context of each view, as well as relationships among different views while navigating the large data set.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

An embodiment of the invention provides an explicit representation of global context in a navigation context view display panel by displaying the user's navigation path. The context view display panel registers as a context change event listener. The context view display panel is updated in response to actions that change the navigation context. In one embodiment, connection lines between context views within a context view display represent relationships between multiple context views. Each context view is rendered as a node inside the navigation context view display panel and displays a highly zoomed-out diagram. A corresponding enlarged (zoomed-in) diagram can be displayed in a details display. In another embodiment, a relative location of a data node within a context view and details display will be visually marked in a hierarchical higher context view.

Figure 1:
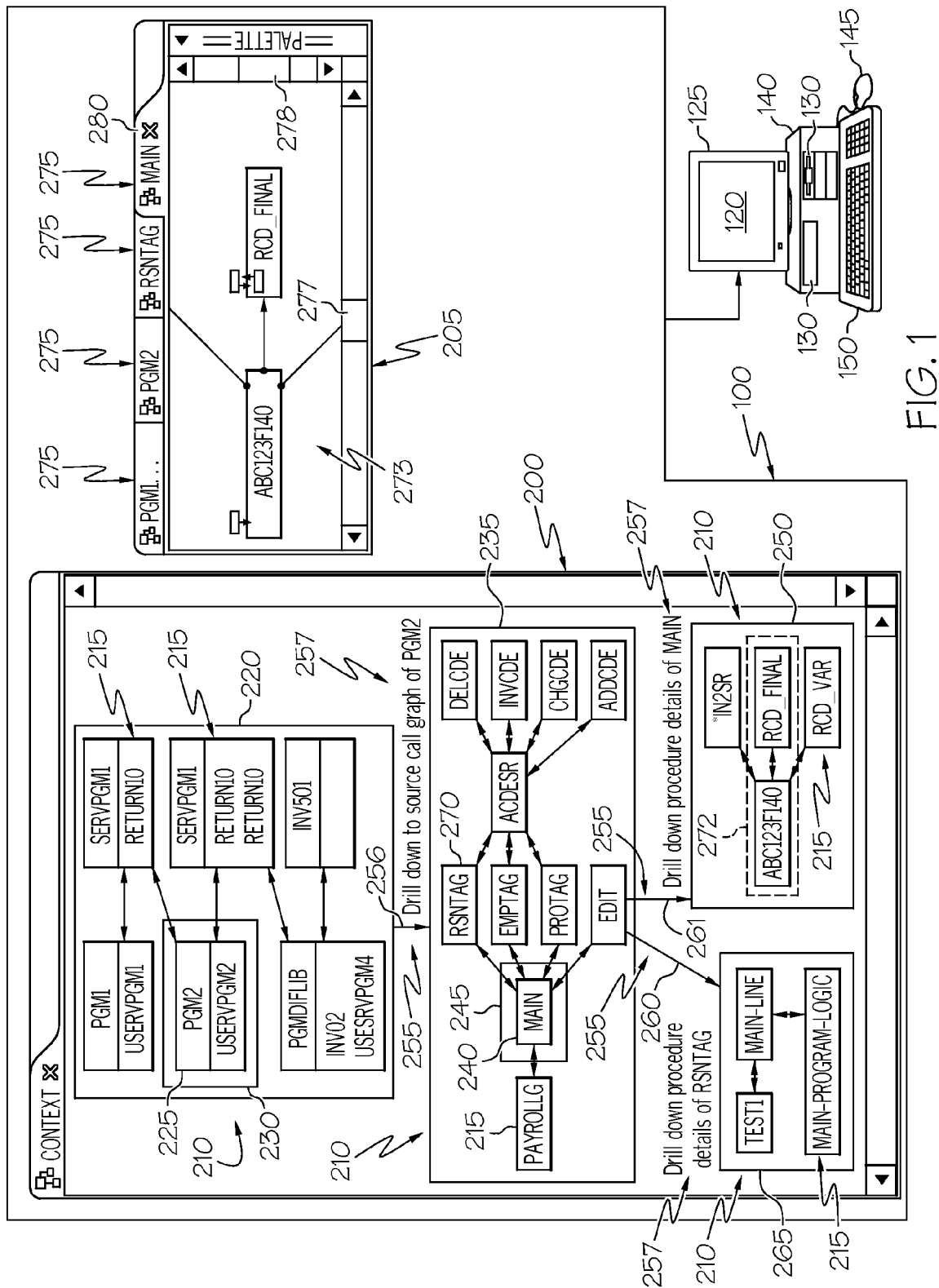
FIG. 1 illustrates one example of an interactive user interface (UI) to manage the searching of data in accordance with an embodiment of the invention.

Turning now to the drawings in greater detail, it will be seen that FIG. 1 depicts an embodiment of an exemplary interactive user interface (UI) display 100 to manage searching of data. The data may be present within a data storage device 130 in data communication with a processing unit 140. The processing unit 140 may be in data communication with input devices, such as a mouse 145 and a keyboard 150, for example, or may be remotely located such as in a server and be in signal communication via a network or wireless communication. The UI 100 is configured to be presented upon a screen 120 of a display device 125. While an embodiment has been depicted with data stored upon a data storage device 130 local to the processing unit 140, it will be appreciated that the scope of the invention is not so limited, and that the invention will also apply to alternate program storage devices that are readable by the processing unit, such as a storage device connected to the processing unit via a network, for example.

In an embodiment, the UI 100 includes a first display panel 200 such as a context view display 200 and a second display panel 205, such as a details display 205. Context views 210 displayed within the context view display 200 include data stored upon the data storage device 130 represented as data nodes 215. Each context view 210 is displayed as hierarchical "parents" and "children", as will be described further below.

By way of illustrative example, context view 220 (also herein referred to as a parent context view) is an application diagram view, and includes a plurality of data nodes 215 organized within the context view 220 that represent several source data files. In response to user selection of a data node 225, such as by selection via mouse 145 for example, indication means 230, (also herein referred to as a first indicator) such as a rectangle surrounding the data node 225 for example is created within the context view 220, and a child context view 235 (relative to context view 220) is created and displayed within the first display panel 200. The indication means 230 indicates that contents of the selected data node 225 are related to, and displayed within, the child context view 235. For example, data nodes 215 within the child context view 235 represent data stored hierarchically as "children" within data node 225 displayed within the context view 220. Continuing the illustrative example, selection of the source data file represented by data node 225 in the application diagram view drills down to display a call graph diagram within the context view 235.

In a similar fashion, selection of a data node 240 displayed within context view 235 initiates indication means 245, and creates a grandchild context view 250 (relative to context view 220). For example, selection of a procedure node, such as data node 240 within the call graph diagram, drills down to display a statement flow chart displayed within the context view 250. Stated alternatively, grandchild context view 250 may be considered a second child context view 250 as related to data node 240 within first child context view 235, which is related to a parent context view 220, or, first child context view 235 may be considered a parent context view relative to child context view 250, for example. Further, data nodes 215 organized within such first child context views, such as data nodes 240 within context view 235 for example, may be referred to as "child nodes", and indication means 245 may be referred to as "a fourth indicator" to distinguish from the "first indicator" 230 displayed within context view 220.

Relationship indicators 255, (also herein referred to as a second indicator) such as connection lines 255 for example, indicate a hierarchical parent/child relationship between different context views 210, such as relationship indicator 256 between context view 220 and context view 235, and relationship indicator 261 between context view 235 and context view 250, for example. In an embodiment, the relationship indicators 255 may include additional information, such as text labels 257 disposed proximate the connection lines 255, to provide a user with additional information regarding the relationship between the context views 210.

The context view display 200 displays relationships among more than one child context views related to data nodes 215 organized within the appropriate parent view, such as child context views 250, 265 relative to parent context view 235. For example, connection line 260 indicates that context view 265 is a child of context view 235. In this example, a prior selection of data node 270 created context view 265, which displays data nodes 215 contained within data node (or "child node") 270. In an embodiment, display of the context view 265 created in response to the prior selection of data node 270 continues until a user closes context view 265. This provides a contextual history of selected data nodes 215 via the context views 210. Proceeding with the foregoing example, the connection lines 255 and their text labels indicate that the context view 235 (the source call graph of PGM2) is created in response to drilling down (that is, selecting) detail node 225 of the context view 220 (the top-level application diagram). Context views 250 and 265 (procedure details diagrams) are created by drilling down data nodes 240 and 270, respectively, of context view 235 (the PGM2 source call graph). Because both context views 250 and 265 (procedure details diagrams) are siblings, it is apparent that data nodes 215 within the context views 250, 265 represent the same hierarchical level of data in the application. As depicted in FIG. 1, (for purposes of illustration, and not limitation) context views 250, 265 may be considered second child views, and relationship indicators 260, 261 may be referred to as "fifth indicators", to be distinguished from the "second indicator" 256 between parent context view 220 and first child view 235.

The details display 205 displays an enlarged portion of one context view 210 of the context view display 200. Display of the enlarged portion of the context view 210 within the details display 205 is controlled via display controls 277, 278, such as scroll bars 277, 278 for example. A display indicator 272, (also herein referred to as a third indicator) such as a dashed rectangle for example, indicates the enlarged portion of the context view 210 that is related to a selected data node 215, such as context view 250 (which is a child of context view 235 and related to data node 240) for example. The location of the indicator 272 is responsive to the display controls 277, 278 to indicate the portion of the context view 210 displayed within the details display 205. The indicators 230, 245 indicate the hierarchy of the data nodes 215 of the context view 210 displayed within the details display 205. For example, indicator 245 indicates that context view 250 (the MAIN procedure details diagram) represents one lower level of details of data for data node (or "child node") 240 within context view 235 (MAIN data node in PGM2's source call graph). Similarly, indicator 230 indicates that context view 235 (parent view of context view 250) represents one lower level of details of data for data node 225 within the context view 220 (which is therefore the grandparent of context view 250). This recursively applies until the top-level context view 210 is reached. From the example, it can be determined that the source call graph of PGM2 (context view 235) represents one lower level of details of the PGM2 application (data node 225) in the application level diagram (context view 220). Therefore, the relationship of a specific portion within the details display 205 to the global context of the hierarchy displayed within the context view display 200 is visually determined without a need for recollection by the user.

In an embodiment, the details display 205 displays at least one diagram 273 of a plurality of diagrams that correspond to one or more of the data nodes 215 organized within context views 210, each diagram of the plurality indicating different context views 210 that have been displayed. Each context view 210 that has been selected by a user is available for display within the details display 205 as a diagram, such as the diagram 273 for example. A title of each diagram is identified by labels 275. Selection of any of the diagram title labels 275 will cause an enlarged portion of the context view 210 represented by the diagram to be displayed within the details display 205. A selected diagram title label 275, such as diagram title label 280 corresponding to diagram 273 as depicted in FIG. 1 for example, shall be indicated via graphical means, such as to change color, flash, become underlined, or other graphical means of differentiating the selected diagram title label 280 from the other diagram title labels 275. Further, in response to selection of any diagram by its title label 275, indicators 272, 245, 230 will be appropriately updated to reflect the appropriate hierarchy of the enlarged portion of the context view displayed within the details display 205.

Accordingly, it will be appreciated that navigation of the details display 205 may be accomplished via selection of a diagram by its title label 275 or a data node 215 within the context view 220, such as the data node 240 within context view 235, as depicted in FIG. 1, for example.

The context view display 200 is statically registered as an event listener of the details display 205 via a component extension mechanism. During a launch of the details display 205, the details display 205 adds the context view display 200 as a listener of specific user navigation events triggered by navigation actions, such as selection of a diagram by its title label 275 and drill down and drill up of the context views 210. As described above, additional context information may optionally be provided via the text labels 257.

Initialization of the context view display 200 includes creation of a top-level context view 210, such as the context view 220, for example. In an exemplary embodiment, following selection of a specific data node 215 in the top-level context view 220, the detail display 205 is created. Additionally, a navigation event is fired from the selection (also known as the drill down action). The event is captured by the context view 220, with two subsequent results. First, a new context view 210, such as the context view 235, which is a zoom-out thumbnail including data nodes 215, is added to the context view display 200. Second, the relationship indicator 255 is created from top-level context view 220 to the context view 235.

The above repeats when a user drills down further to deeper levels. When the user closes a context view 210 or closes the diagram 273 for a context view 210 from details display 205, the corresponding node 210 and associated relationship indicator 255 will be removed from the context view display 200. Therefore, the context view display 200 provides a diagram representing the global context corresponding to user's navigation history and the relationship among all opened context views 210 in different levels by user.

Figure 2:
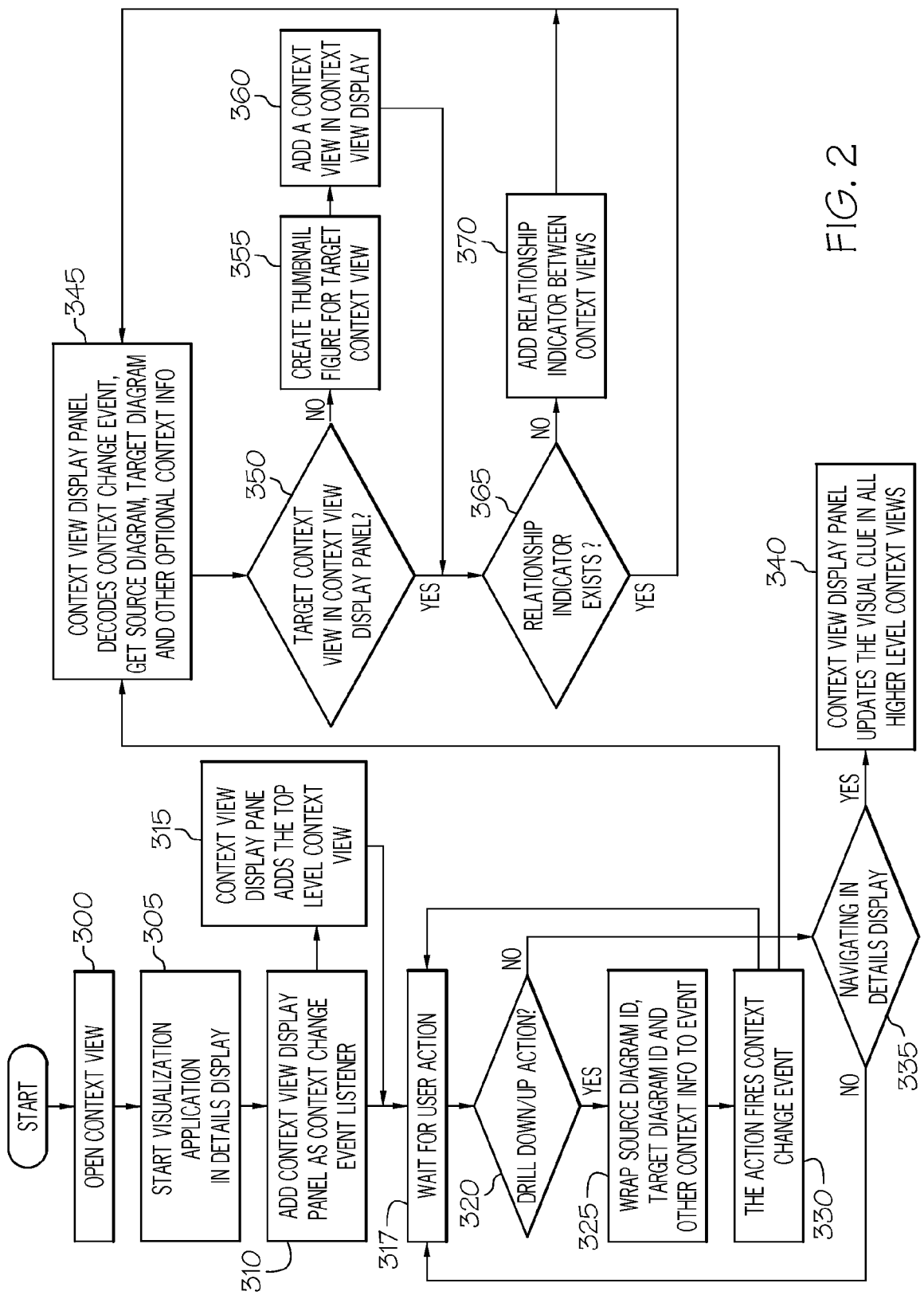
FIG. 2 illustrates one example of a flowchart for a method to practice an embodiment of the invention.

FIG. 2 depicts a flowchart of an exemplary process performed by the processing unit 140, to provide the UI described above. The process begins at block 300 by opening the context view display 200 and proceeds to block 305 by starting an application to generate the details display 205. At block 310, the process continues by adding the context view display 200 as a context change event listener. At block 315, the top-level context view 220 is added to the context view display 200. At block 317, the process awaits additional user action, such as selection of a data node 215 or label 275 for example.

At decision block 320, the process determines if a drill down or drill up action (such as selection of a data node 215 for example) has occurred. In response to such an action, block 325 wraps, or includes source diagram information, such as the data describing a selected data node 215, target diagram information, such as data contained by the selected data node 215 for example, and any other context information, such as the relationship indicators 255 and text labels 257, for example. At block 330, the action fires a context change event. Following the context change event initiated by block 330, the process proceeds to block 317 to await further user action and proceeds to block 345.

At block 345, the context view display 200 decodes the context change event, obtains diagrams (such as the graphical diagrams displayed within the display panel 200 for example) for display of the data structure related to the source diagram, the target diagram, and other context information.

At decision block 350, the process determines if the context view 210 associated with the selected data node 215 is presently displayed within the context view display 200. If so, the process proceeds directly to decision block 365 as described below. If it is not, however, the process first continues at block 355 with creating a thumbnail figure for the context view 210 that contains data within the selected data node 215. A "thumbnail figure" refers to the general outer area and shape of the specific context view 210 within the context view display 200. At block 360, the graphics to be displayed as the context view 210 are displayed upon the context view display 200 within the "thumbnail figure".

At decision block 365, the process determines if the relationship indicator 255 is displayed between context views 210 displayed within the context view display 200. If the relationship indicator 255 is not displayed between context views 210, it is added as shown in block 370. It will be appreciated that in an embodiment, other contextual information, such as text labels 257 may also be added. Following the determination that the relationship indicator 255 is displayed (by decision block 365) or the addition of relationship indicator 255 at block 370, the process returns to block 345 to update any changes accordingly.

Referring back to decision block 335, if the process determines that the user is navigating within the details display 205, such as selecting one of the diagrams by its title label 275, block 340 updates the indicators 272, 230, 245 in the context view display 200.

In an embodiment, the context view display 200 can be can be exported and shared with other users. Exporting the context view display 200 for use by other users can allow for quick reconstruction of a navigation path to find specific data with reduced time and effort.

In view of the foregoing, it will be appreciated that the UI 100 facilitates an exemplary method of navigating data that includes displaying the interactive user interface (UI) 100 including the first display panel 200 which includes the parent context view 220 and the child context view 235, and the second display panel 205 comprising the enlarged portion of the child context view 235. The exemplary method further includes selecting the data node 225 from one or more data nodes 215 organized within the parent context view 220. In response to the selecting the data node 225, the method continues by displaying the first indicator 230 within the parent context view 220 to indicate a relationship between the selected data node 225 and the child context view 235, displaying the second indicator 256 to indicate the relationship between the child context view 235 and the parent context view 220, and displaying the third indicator 270 (such as depicted within context view 250) to indicate the enlarged portion of the child context view 235 that is displayed within the second display panel 205.

The method further allows choosing a label 275, such as chosen label 280 depicted in FIG. 1 that displayed upon the second display panel. The label 280 corresponding to the data node 240 organized context view 235 (which is a parent context view to context view 250). In response to the choosing the label 280, the data node 240 that corresponds to the label 280 is selected, thereby causing the enlarged portion of the context view 250 related to the selected data node 240 to be displayed upon the second display panel 205.

In an embodiment, the first display panel 200 of the UI 100 includes a plurality of child context views, such as context views 235, 250, and 265 for example. A first child context view, such as child context view 235 of the plurality includes least one data node 215, also known as a "child node". The exemplary method illustrated by the UI 100 of FIG. 1 further includes selecting the child node 240 from the child nodes 215 within the first child context view 235. In response to selecting the child node 240, the method includes displaying the second child context view 250 related to the selected child node 240, displaying the fourth indicator 245 within the first child context view 235 to indicate the relationship between the selected child node 240 and the second child context view 250, displaying the fifth indicator 261 to indicate the relationship between the second child context view 250 and the first child context view 235, and displaying the third indicator 272 within the second child context view 250 to indicate the enlarged portion of the second child context view 250 displayed within the second display panel 205. Further, the choosing the label 275 includes choosing the label 275 that corresponds to one of the one or more child nodes 215 organized within the first child context view 235, such as label 280 corresponding to child node 240, and in response to the choosing, the selecting the child node 240 thereby dynamically updates the display of the third indicator 270, fourth indicator 245, and fifth indicator 261.

While an embodiment of the invention uses a rectangle as indication means 230, 245, 272, it will be appreciated that the scope of the invention is not so limited, and that other embodiments to differentiate a context view are contemplated as within the scope of the invention, such as to change the color of the node, to cause the node to flash, and to change the size of the node, for example.

While an embodiment shows relationship indicators as connection lines, and text labels, it will be appreciated that the scope of the invention is not so limited, and that other embodiments to provide contextual information are contemplated as within the scope of the invention, such as location of placement, and pop-up windows responsive to cursor placement for example.

As disclosed, some embodiments of the invention may include some of the following advantages: A reduction in user cognitive load by providing an explicit global context diagram to discern where the details display 205 diagram of any level fits into the data hierarchy; reduction in user cognitive load to determine a relationship among children views through relationship indicators; support of multiple levels of overview-details mapping such that each level within the details display 205 has a corresponding context view 210 in the context view display 200; a display in each hierarchical parent context view 210 of the position of the children context views 210, and an ability to capture increased amounts of context information can via relationship indicators and text labels.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An interactive user interface (UI) to manage searching of data, the UI comprising:
   a processor and a memory;
   a first display panel and a second display panel;
   the first display panel configured to display a plurality of distinct context views thereon, the distinct context views comprising a parent context view and a child context view;
   a plurality of at data nodes organized within the parent context view;
   a first indicator completely within the parent context view, the first indicator responsive to selection of one of the at least one data nodes to indicate a relationship between the selected data node and the child context view;
   a second indicator between the parent context view and the child context view to indicate a relationship between the child context views and the parent context view;
   a third indicator completely within the child context view to indicate a portion of the child context view related to the selected data node, a diagram of the portion of the child context view enlarged and displayed on the second display panel; and
   the second display panel configured to display one or more diagrams thereon, each of the one or more diagrams corresponding to one of the at least one data nodes organized within the parent context view;
   wherein the second display panel is responsive to selection of one of the one or more diagrams to select the corresponding data node, thereby displaying the diagram of the portion of the child context view related to the selected data node;

the child context view is one of a plurality of child context views;

a first child context view of the plurality of child context views comprises at least one child node;

a second child context view of the plurality of child context views is related to the child node of the first child context view;

the interactive user interface further comprises:

a fourth indicator completely within the first child context view, the fourth indicator responsive to selection of one of the at least one child nodes to indicate a relationship between the selected child node and the second child context view; and a fifth indicator between the first child context view and the second child context view to indicate a relationship between the second child context view and the first child context view;

a sixth indicator is displayed completely within the second child context view to indicate a portion of the second child context view related to the selected child node; and at least one of the one or more diagrams corresponds to at least one of the at least one child nodes within the first child context view.

2. The interactive user interface of claim 1, wherein:

more than one child context views of the plurality of child context views is related to a corresponding one parent context view.

3. The interactive user interface of claim 1, wherein:

the second display panel is responsive to selection of one of the one or more diagrams to select the corresponding child node, thereby displaying a diagram of an enlarged portion of the second child context view upon the second display panel.

4. A method for navigating data, comprising:

a processor and a memory;

displaying an interactive user interface (UI), the UI comprising a first display panel comprising a parent context view and a child context view, and a second display panel comprising one or more diagrams of an enlarged portion of the child context view;

selecting a data node from a plurality of one data nodes organized within the parent context view;

in response to the selecting:

displaying a first indicator completely within the parent context view to indicate a relationship between the selected data node and the child context view;

displaying a second indicator between the parent context view and the child context view to indicate a relationship between the child context view and the parent context view; and displaying a third indicator completely within the child context view that is related to the selected data node to indicate the enlarged portion of the child context view displayed within the second display panel;

choosing a diagram of the one or more diagrams displayed upon the second display panel, the diagram corresponding to one of the one or more data nodes organized within the parent context view;

wherein in response to the choosing, the selecting the data node from one or more data nodes comprises selecting the one data node that corresponds to the chosen diagram; and wherein the displaying an interactive UI comprises displaying the first display panel having a plurality of child context views, a first child context view of the plurality comprising at least one child node;

selecting a child node from the at least one child node;

in response to the selecting the child node:

displaying a second child context view related to the selected child node of the first child context view;

displaying a fourth indicator completely within the first child context view to indicate a relationship between the selected child node and the second child context view;

displaying a fifth indicator between the first child context view and the second child context view to indicate a relationship between the second child context view and the first child context view; and displaying a sixth indicator completely within the second child context view to indicate an enlarged portion of the second child context view displayed within the second display panel;

the choosing comprises choosing a diagram of the one or more diagrams that corresponds to one of the one or more child nodes organized within the first child context view; and in response to the choosing, the selecting a child node comprises selecting a child node that corresponds to the chosen diagram.

5. The method of claim 4, wherein:

more than one child context views of the plurality of child context views is related to a corresponding one parent context view.

6. The method of claim 4, wherein:

the second display panel is responsive to selection of one of the one or more diagrams to select the corresponding child node, thereby displaying a diagram of an enlarged portion of the second child context view upon the second display panel.

* * * * *